US008413503B2

(12) United States Patent  (10) Patent No.: US 8,413,503 B2
Graboi et al.  (45) Date of Patent: *Apr. 9, 2013

(54) CONSTANT TEMPERATURE ANEMOMETER

(75) Inventors: Dan Graboi, Encintas, CA (US); Finn Sveen, Redlands, CA (US); John Garriott, Orange, CA (US)

(73) Assignee: CareFusion 207, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,257

(22) Filed: Mar. 24, 2011

(65) Prior Publication Data

US 2011/0167902 A1  Jul. 14, 2011

Related U.S. Application Data

(63) Continuation of application No. 12/540,143, filed on Aug. 12, 2009, now Pat. No. 7,946,167.

(51) Int. Cl.
  *G01F 1/68* (2006.01)
(52) U.S. Cl.
  USPC .................................. 73/204.15; 73/204.18
(58) Field of Classification Search .......... None
  See application file for complete search history.

(56) References Cited

U.S. PATENT DOCUMENTS

| | | | |
|---|---|---|---|
| 4,503,706 A | 3/1985 | Kolodjski | |
| 4,523,462 A | 6/1985 | Kolodjski | |
| 4,920,793 A | 5/1990 | Djorup | |
| 5,069,066 A * | 12/1991 | Djorup | 73/204.15 |
| 5,218,865 A | 6/1993 | Djorup | |
| 5,263,369 A | 11/1993 | Cutler | |
| 5,282,385 A | 2/1994 | Kayano et al. | |
| 5,357,795 A | 10/1994 | Djorup | |
| 5,654,507 A * | 8/1997 | Hicks et al. | 73/204.14 |
| 6,840,116 B2 | 1/2005 | Higgins | |
| 7,647,843 B2 | 1/2010 | Burton | |
| 7,946,167 B2 * | 5/2011 | Graboi et al. | 73/204.15 |
| 2002/0100474 A1 | 8/2002 | Kellner et al. | |
| 2004/0040386 A1 | 3/2004 | Higgins | |

(Continued)

FOREIGN PATENT DOCUMENTS

| | | |
|---|---|---|
| EP | 1321748 | 6/2003 |
| EP | 1338871 | 8/2003 |
| PL | 185477 | 5/2003 |

OTHER PUBLICATIONS

Beta Evaluation of the Enhanced Mass Flow Sensor (emfs) and Vmax Spectra Software, by SensorMedics Corp. Jun. 14, 2001.

(Continued)

*Primary Examiner* — Andre Allen
(74) *Attorney, Agent, or Firm* — McDermott Will & Emery LLP

(57) ABSTRACT

A constant temperature anemometer is disclosed. The anemometer includes electrically conductive pins including a first set of pins and a second set of pins. A conductor is coupled to the electrically coupled pins. A current source is configured to provide a current through the conductor between the first set of pins. A voltage sensor is configured to measure the voltage across the conductor between the second set of pins. The current source and voltage sensor are configured to maintain a constant resistance of the conductor between the first set of pins.

17 Claims, 3 Drawing Sheets

U.S. PATENT DOCUMENTS

| | | | |
|---|---|---|---|
| 2008/0028848 A1* | 2/2008 | Christensen | 73/195 |
| 2008/0066541 A1* | 3/2008 | Burton | 73/204.15 |
| 2008/0092645 A1 | 4/2008 | Kanke | |
| 2008/0271545 A1 | 11/2008 | Burton | |
| 2011/0296910 A1* | 12/2011 | Lopez et al. | 73/204.27 |

OTHER PUBLICATIONS

"Tech Support: Applications Note 20: Quad Tracking Power Supply Manager," Summit Microelectronics, Inc.; printed from -support/notes/note20.htm> on Mar. 30, 2002.

"Hot-Wire Anemometers: Introduction", efunda engineering fundamentals, printed from -wires/hot-wires-theory.cfm> on Mar. 31, 2002.

Hot-Wire Anemometers: Introduction, Overview, efunda engineering fundamentals, printed from http://www.efunda.com/designstandards/sensors/hot-wires/hot-wires-intro.cfm> on Mar. 21, 2002.

International Search Report for International Application No. PCT/US2010/043556 dated Nov. 10, 2010 (7 pages).

Written Opinion of the International Searching Authority for International Application No. PCT/US2010/043556 dated Nov. 10, 2010 (6 pages).

* cited by examiner

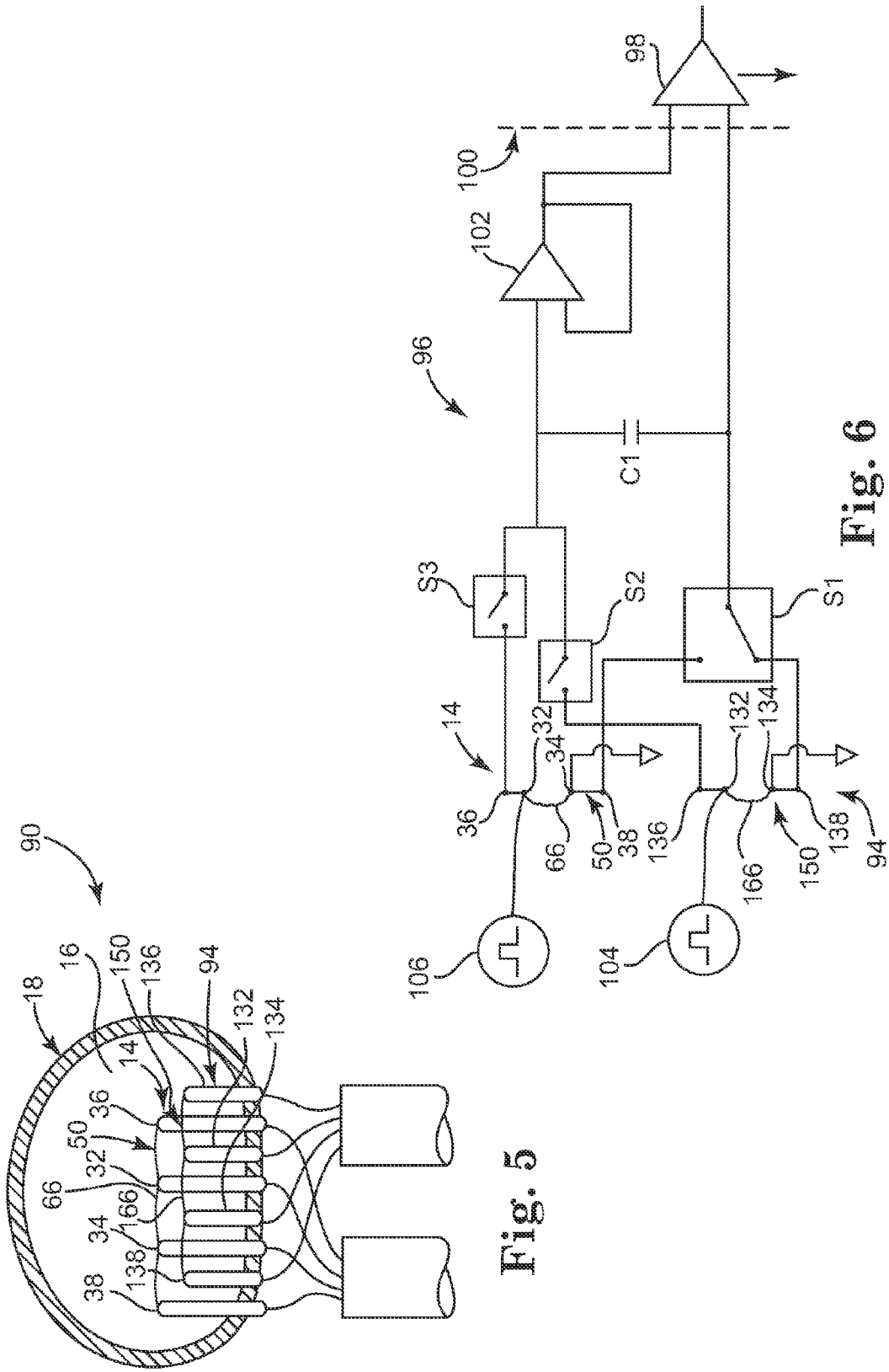

CONSTANT TEMPERATURE ANEMOMETER

RELATED PATENT APPLICATIONS

This application is a continuation of U.S. patent application Ser. No. 12/540,143 filed on Aug. 12, 2009.

BACKGROUND

Constant temperature hot-wire anemometers are often used to measure fluid velocity based on the amount of heat convected away by a fluid passing over a wire heated to a constant temperature. The amount of heat lost due to convection is a function of the fluid velocity passing over the filament. Constant temperature hot-wire anemometers, or CTAs, hold the temperature of a heated filament constant, and use empirical data, mathematical algorithms, or both to calculate the flow rate of a fluid based on the energy used to keep the filament at the constant temperature. Because filament temperature is related to the electrical resistance of filament, the CTA operates to maintain a constant resistance of the filament. Metals used to fabricate suitable filaments have resistivity coefficients on the order of 0.1 percent per degree Celsius, and thus a high degree of accuracy is needed for measuring the actual resistance of the filament.

One medically-related application for anemometers is to measure the inspiration and exhalation flow rates of a patient. Many lung function tests require knowing details on the rate at which air is entering and exiting a patient's lungs. The maximum realistic flow rate range encountered during inspiration and exhalation typically varies between 0 and about 20 liters per second. In this range a filament may have a resistance of only 2.0 ohms. Because the resistance and the resistivity coefficient of the filament are low, even small resistance artifacts can significantly impair measurement accuracy.

In prior art constant temperature hot-wire anemometers, a filament is welded between two pins of a probe. The probe is detachably attached to a cable. The cable communicates with circuitry for calculation of the gas flow rate passing over the filament. There are several problems, however, with the prior art constant temperature anemometer that prevents the acquisition of accurate and precise resistance measurements. For example, there is no way to differentiate between resistivity of the filament and resistivity caused by the cable and any connections between the pins and the circuitry. Any resistance change caused by the cable or the connections will be seen by the circuitry as a change in the resistance of the filament and result in an erroneous gas flow calculation. There are several ways by which resistance errors can be introduced in the prior art constant temperature anemometer probe. These include, for example, changes in ambient temperature, and physical disturbance or movement of the cable and/or connections. Some of these errors cannot be eliminated nor reversed without a complete recalibration of the probe, which can take a considerable amount of time and effort.

Practical considerations require that the probe be designed in such a manner that allows a user to attach and remove the probe from a cable connecting the probe to the unit housing the circuitry such as when the probe is disposable or requires replacement, maintenance, or cleaning. Consequently, cables and connectors are virtually required in all probe designs, thereby insuring the existence of the aforementioned error mechanisms.

SUMMARY

The present disclosure relates to a constant temperature anemometer. The anemometer includes electrically conductive pins including a first set of pins and a second set of pins. A conductor is coupled to the electrically coupled pins. A current source is configured to provide a current through the conductor between the first set of pins. A voltage sensor is configured to measure the voltage across the conductor between the second set of pins. The current source and voltage sensor are configured to maintain a constant resistance of the conductor between the first set of pins.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5 is a schematic drawing illustrating a section of another example constant temperature hot conductor anemometer.

FIG. 6 is a schematic drawing illustrating an example partial circuit of the constant temperature hot conductor anemometer of FIG. 5.

DETAILED DESCRIPTION

In the following Detailed Description, reference is made to the accompanying drawings, which form a part hereof, and in which is shown by way of illustration specific embodiments in which the invention may be practiced. In this regard, directional terminology is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
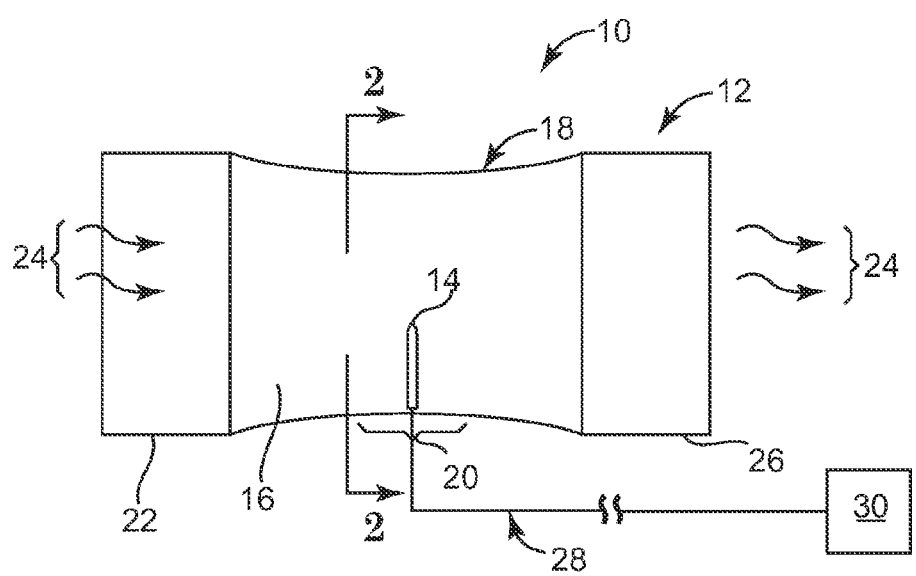
FIG. 1 is a schematic drawing illustrating an environment of an example constant temperature hot conductor anemometer.

FIG. 1 illustrates an environment 10 of one example of a constant temperature hot conductor anemometer (CTA) 12 of the present disclosure. The CTA 12 includes a probe set 14 disposed within a lumen 16 of an anemometer body 18. In the example, the body 18 includes a constricted section 20 where the probe set 14 is positioned. In the example environment, a user will blow or breathe into a first end 22 of the anemometer, and the exhaled breath 24 will pass through the lumen 16, over the probe set 14, and out a second end 26 (the flow rate can also be determined if the flow is in the opposite direction, such as during inhalation). In the example, the first end 22 can include a mouthpiece and a filer to interface with the user. Of course, an anemometer of the present disclosure can be configured for other applications involving fluid flow or temperature measurement, and an anemometer can be constructed to include an appropriate body and probe set that are suitable for other fluids than inhaled and exhaled breath.

The probe set 14 is often connected to a cable 28 that is electrically coupled to a control and measurement device 30 often remotely located from the probe set 14. In the illustrated example, the cable 28 is coupled to the control and measurement device 30. One or more connections (not shown) can be included in coupling the probe set 14 to the measurement device. The control and measurement device 30 is configured to maintain constant a temperature on a conductor in the probe set 14. The energy used to maintain the constant temperature, particularly when energy is being taken away from the probe set 14 with the flowing fluid 24, is measured and calculated with the device 30 to determine fluid flow.

Figure 2:
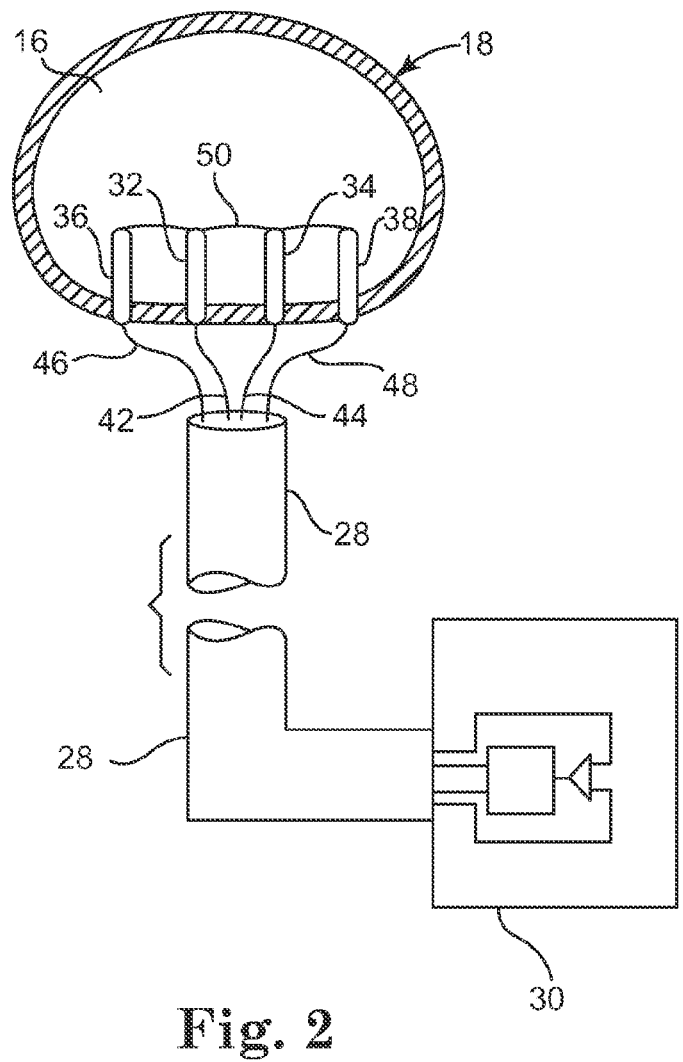
FIG. 2 is a schematic drawing illustrating a section of the example constant temperature hot conductor anemometer of FIG. 1.

FIG. 2 illustrates the CTA 12 in a sectional view of the CTA along lines 2-2 in FIG. 1. FIG. 2 also illustrates a more detailed view of the probe set 14. The probe set 14 in this example includes four electrically conductive pins including inner pins 32, 34, and outer pins 36, 38. Each pin is associated with its own electrically conductive wire. Each of the pins are electrically coupled to a corresponding wire, such as pin 32 with wire 42, pin 34 with wire 44, pin 36 with wire 46, and pin 38 with wire 48 in the example. The wires can be mechanically coupled together as the cable 28, and each wire is provided to an electrical connection on the control and measurement device 30. In one example shown in FIG. 3, the control and measurement device includes dedicated electrical connections 52 for wire 42, 54 for wire 44, 56 for wire 46, and 58 for wire 48.

Returning to the probe set 14 illustrated in FIG. 2, the pins 32-38 are connected together with a single conductor 50, which can be for example an electrically conductive conductor or film, extending across all the pins. In another example (not shown), the conductor can be divided into three segments, where the conduction path between pins 36 and 32, and the conduction path between pins 34 and 38 can be an extension of the pins. The conductor 50 between pins 32 and 34 in the example is mechanically and electrically attached to each pin at a node. The conductor can be attached to the pins in a number of suitable ways such as through spot welding. The conductor can be formed of a number of suitable materials such as a stainless steel filament, or more particularly "304" stainless steel, platinum, and/or platinum rhodium alloy, for example. In one example, the conductor has a cross sectional diameter of approximately 25.4 micrometers (0.0000254 meters).

Figure 3:
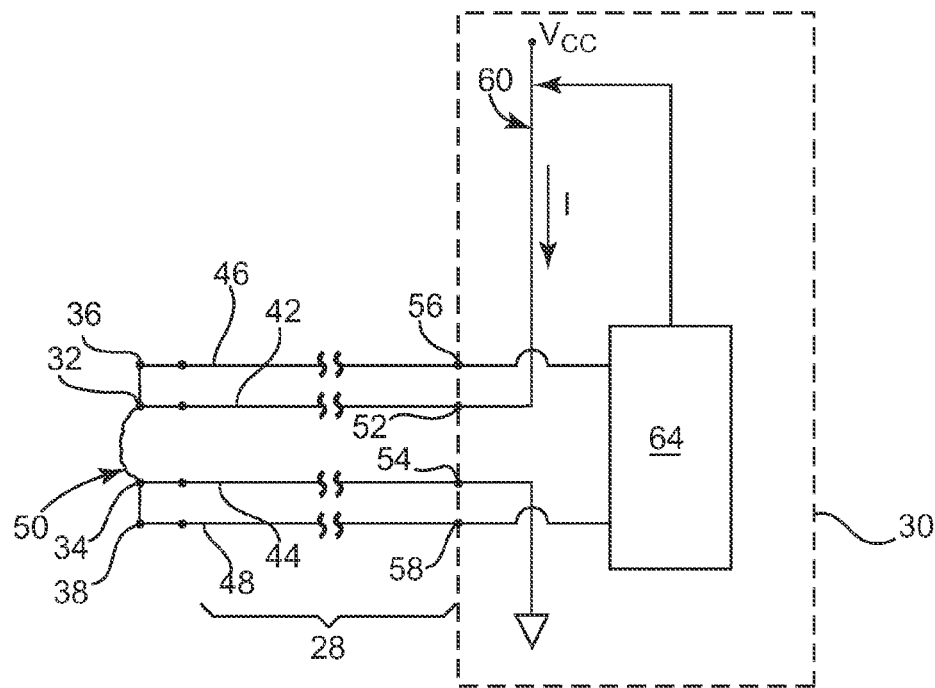
FIG. 3 is a schematic drawing illustrating an example circuit of the constant temperature hot conductor anemometer.

FIG. 3 illustrates the example CTA 12 with an example circuit of device 30. Wires 42 and 44 are connected to a drive circuit 60 of the device 30. The drive circuit provides a current I through wires 42 and 44 to the conductor 50 between the inner pins 32 and 34, which heats the conductor 50. The drive circuit maintains a constant resistance and hence a constant temperature of the conductor 50 between inner pins 32, 34, with the current. The amount of current needed to maintain the constant temperature is measured and used to calculate the flow of fluid across the conductor 50.

Wires 46 and 48 are connected to a high impedance voltage detector 64 and to the conductor 50 at outer pins 36, 38. Although current flows in the conductor between pins 32 and 34, an insignificant current, flows in wires 46, 48 to the voltage detector. Because only an inconsequential current flows in wires 46, 48, those wires provide an inconsequential resistance. The voltage measured across outer pins 36, 38 is essentially the same voltage across inner pins 32, 34. Thus, the voltage detector receives the voltage across the energized portions of the conductor 50 between the inner pins 32, 34 without resistance artifacts from cables, connectors, welds, and the like. The resistance of the conductor 50 can be calculated in the device 30 with the current measured with the drive circuit 60 and the voltage at the detector 64. This approach can be described as a "Kelvin sensing" technique. The temperature of the conductor is a function of its resistance, and a processor on the device is able to calculate fluid flow based on several factors including the energy or power required to maintain the constant resistance of the conductor 50 between pins 32 and 34 in the CTA 12.

Figure 4:
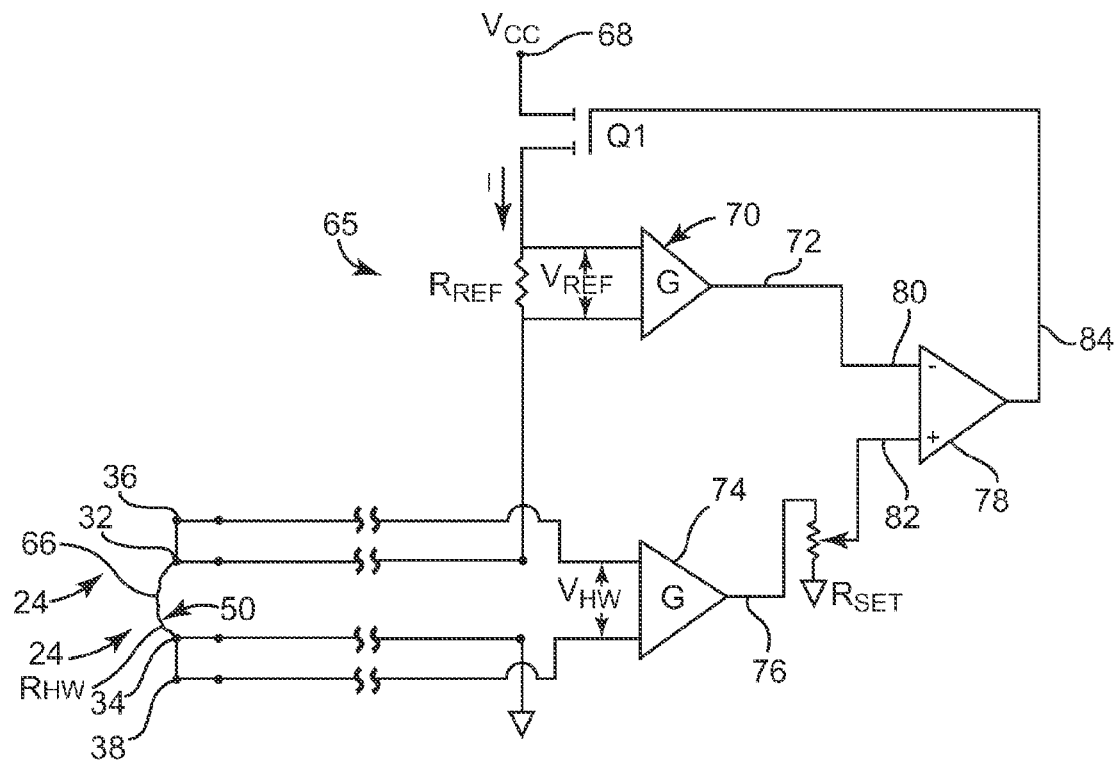
FIG. 4 is a schematic drawing illustrating an example circuit of the circuit of FIG. 3.

FIG. 4 illustrates an example circuit suitable for use in the driver 60 and the detector 64 as a CTA servo 65. The servo 65 maintains a constant resistance RHW of the conductor 50 between pins 32, 34, or the "hot wire" 66 although the conductor can be a hot film, or other suitable conductor of electricity. Because temperature of the hot wire 66 is a function its resistance RHW, the servo 65 also maintains a constant temperature of the hot wire 66. Transistor Q1 is controlled to allow a current I to flow from a voltage source 68 through the transistor Q1. In the example, the voltage source is set at generally +5 volts. The current I, flows through a fixed reference resistance RREF, such as a 2 ohm resistor in the example, and through the hot wire 66. Other current-sensing methods may be used in place of RREF.

The servo 65 also includes differential input instrumentation amplifiers 70, 74, and 78. A voltage VREF across the reference resistance RREF is input into amplifier 70 having a gain G and an output 72. The output 72 is a function of the current I flowing through the hot wire 66. The voltage VHW across the hot wire 66 is provided from outer pins 36, 38 to amplifier 74 also having a gain G and an output 76. The output 76 is a function of voltage across the hot wire 66 VHW. In the example, the gain G of amplifiers 70, 74 is five. Amplifier 78, or error amplifier 78, is coupled to the outputs of amplifiers 70, 74. Error amplifier 78 includes a negative input 80 and a positive input 82. The output 72 of amplifier 70 is provided to the error amplifier 78 at negative input 80, and the output 76 of amplifier 74 is provided to the error amplifier 78 at positive input 82. An output 84 of the error amplifier 78 is connected to the gate of transistor Q1.

The servo 65 is balanced when the two voltage inputs 80, 82 to the error amplifier 78 are equal. This occurs when VREF is equal to VHW, and this occurs when RREF equals RHW or two ohms as in the example (this assumes that RSET is at its maximum setting and does not attenuate the output 76 of amplifier 74).

The hot wire 66 begins to cool as fluid flows across the conductor 50, which causes a decrease in RHW. Reducing RHW causes the voltage at output 76 to decrease, which drives the gate of Q1 more negative. This in turn increases the current I through RREF and RHW. The hot wire 66 increases its resistance RHW with the increased current, but RREF does not change. The servo 65 comes to a new balance at a greater current I when RREF again equals RHW. The voltages output 72, 76 from amplifiers 70, 74 will also increase at the new balance point. The opposite will occur when fluid flow is reduced. The servo 65 acts to keep RHW constant, which means the temperature of the hot wire 66 is kept constant. The energy used to keep the conductor at the constant temperature is a function of the voltage across the hot wire 66, which, can be used in the calculation to determine the flow rate of the fluid.

The high impedance inputs of amplifier 74 are at most inconsequentially affected by resistance in wires 46, 48, or changes in their resistivity due to changes in ambient temperature or changes in resistance of connections (not shown) to these wires. Only the isolated resistance of the hot wire 66 (possibly above the welds) where the hot wire 66 is attached to the pins 32-38, participates in the action of the servo 65.

The servo 65 can also include a variable resistor RSET to set the working temperature of the hot wire 66. RSET is connected to the output 76 of amplifier 74 and to the positive input 82 of the error amplifier 78. In one example, RSET is a digitally controlled variable resistor that can be controlled by a processor on the device 30. The variable resistor can assume a resistance division value RSET, which will serve to attenuate the output 76 before it is input into the error amp 78. The variable resistor RSET attenuates output 76 of amplifier 74 when its adjustable tap is set to less than its maximum value. When the variable resistor attenuates output 76 of amplifier 74, VHW must be higher than without the attenuation of the variable resistor in order for the servo 65 to be balanced. This results in an increase of the working temperature of the hot wire 66. Thus, the lower the resistance between the adjustable wiper of RSET and ground, the higher the constant working temperature setting of the hot wire 66.

FIG. 5 illustrates an example of a two-channel CTA 90, where like parts get like reference numerals. In this case, the first probe set 14 with conductor 50 and hot wire 66 are the same as in the CTA 12, and are coupled to a second measurement and control device 96 in the same manner as they are coupled to the device 30 included above.

The CTA 90 in this example further includes a second probe set 94 having inner pins 132, 134 and outer pins 136, 138 electrically and mechanically coupled to a conductor 150 similarly to probe set 14. The conductor between inner pins 132, 134 is referred to as a cold wire 166, and is used to measure the temperature of the fluid in the body 18 of the two-channel CTA 90. The conductor of the cold wire 166 in one example is a filament.

The temperature of the fluid is determined from the temperature of the cold wire 166, which is determined by the resistance of the cold wire 166. A small average current I' is passed through the cold wire 166 so as not to cause significant heating in the conductor 150. The voltage drop across the outer pins 136, 138 is measured with a separate sense circuit in device 30. Kelvin sensing techniques like those described above are used to determine the voltage across the outer pins 136, 138.

In this example, the cold wire 166 can measure the temperature of the fluid with greater precision if the current I' through the conductor 150 is pulsed with short, infrequent, relatively high current pulses in such a way that the total current through the wire over time inconsequentially heats the cold wire 166. During the short pulse, the voltage drop across the outer pins 136, 138 is measured allowing a precise determination of the resistance, and hence, its temperature and the temperature of the fluid.

FIG. 6 illustrates an example sample and hold circuit 96, which can be used with the two-channel CTA 90 that can be used to measure the resistance of the hot wire 66 and the cold wire 166 at separate times. The CTA is calibrated at a known ambient temperature, which at calibration time is read from a separate thermometer. At calibration, the resistance of each wire 66, 166 is determined at ambient temperature. Calibration can be used to help set the working constant temperature of the hot wire 66 and can be used to help measure the dynamic temperature of the ambient fluid with the cold wire 166, which in turn can permit a more accurate measurement of fluid flow through the CTA 90.

The circuit is coupled to the first probe set 14 and the second probe set 94 and includes a plurality of switches S1, S2, S3 that are used to couple the conductors 50, 150 to an input channel 98 of an analog to digital converter 100. The switches S2, S3 have low resistance when set to on and can be controlled by the processor. The switch S1 in the example is a single pole, double throw (SPDT) switch and can be controlled by the processor.

To measure the resistance of the cold wire 166, the common terminal of switch S1 is selected to pin 138, and switches S2 and S3 are set to off. A cold wire current pulse 104 of known value is provided through pin 132 to the cold wire 166. The current flows to ground through pin 134. In one example, the cold wire pulse 104 is a 10 microsecond, 200 milliampere pulse. After the beginning of the pulse 104, switch S2 is turned on then and turned off before the end of the pulse. In one example, the switch is turned on 1 microsecond after the beginning of the pulse 104 and turned off 1 microsecond before the end of the pulse. Thus, the capacitor C1 has 8 microseconds to sample the voltage across the cold wire 166 before a hold mode. In the example, the capacitor C1 can be a high quality polypropylene capacitor. The amplifier 102 can include a unity gain, and it can be included because the impedance of the ADC 100 can fluctuate depending on operation of the ADC. The cold wire pulses 104 are short enough and infrequent enough to not appreciably heat the cold wire 166 above the ambient temperature. Since the value of current pulse is known and the voltage generated by the current pulse 104 across the cold wire 166 is measured using a channel 98 of ADC 100, the resistance of the cold wire can be determined by Ohm's Law. Once the cold wire resistance has been determined at a known ambient temperature during calibration time, the dynamic temperature of the fluid surrounding it during operation of the CTA can be calculated.

For calibration purposes, the measurement of the resistance of the hot wire 66 at ambient temperature, and at a time when the servo 65 is not electrically connected to it, is done in an analogous way to the measurement of the resistance in the cold wire 166. To measure the resistance of the hot wire 66, switch 51 is selected to pin 138, and switches S2 and S3 are set to off. A hot wire current pulse 106 of known value is provided through pin 32 to the hot wire 66. The current flows to ground through pin 34. In one example, the hot wire pulse 106 is a 10 microsecond, 200 milliampere pulse. After the beginning of the pulse 106, switch S3 is turned on, then turned off before the end of the pulse. In one example, the switch is turned on 1 microsecond after the beginning of the pulse and turned off 1 microsecond before the end of the pulse. Thus, capacitor C1 has 8 microseconds to sample the voltage across the hot wire 66 before a hold mode. The voltage sampled by C1 is measured by ADC 100 as described above for the cold wire, and the resistance of the hot wire at calibration time is computed analogously to the computation of cold wire resistance described above. Once the hot wire resistance has been determined at a known ambient temperature during calibration time, the constant working temperature of the hot wire during operation of the CTA can be set accurately.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A constant-temperature anemometer, comprising:
 a plurality of electrically conductive pins including a first set of pins and a second set of pins;
 a conductor coupled to the plurality of electrically conductive pins;
 a current source configured to provide a current through the conductor between the first set of pins; and
 a voltage sensor configured to measure a voltage between the second set of pins;
 wherein the current source and voltage detector are configured to maintain a constant resistance of the conductor between the first set of pins.

2. The anemometer of claim 1 wherein the resistance of the conductor between the first set of pins is related to the temperature of the conductor.

3. The anemometer of claim 1 wherein the first set of pins includes two pins.

4. The anemometer of claim 3 wherein the second set of pins includes two pins.

5. The anemometer of claim 1 wherein the plurality of electrically conductive pins are connected to a servo configured to maintain a constant resistance of the conductor between the inner pins when heat is convected from the conductor, wherein the servo includes the current source and the voltage sensor.

6. The anemometer of claim 5 wherein the servo adjusts an amount of current from the current source based on the voltage across the conductor and a second voltage across a reference resistor in series with the conductor.

7. The anemometer of claim 1 wherein the plurality of electrically conductive pins are configured to be disposed in a fluid.

8. The anemometer of claim 7 and further comprising a fluid temperature sensor configured to dynamically measure temperature of the fluid.

9. The anemometer of claim 8 wherein the fluid temperature sensor includes,
 a third set of pins, a fourth set of pins, and a second conductor coupled to the third set of pins and the fourth set of pins;
 a second current source coupled to the third set of pins and configured to provide a second current through the second conductor between the third set of pins;
 a second voltage sensor coupled to the fourth set of pins and configured to measure a second voltage across the fourth set of pins;
 wherein the resistance of the second conductor between the third set of pins is related to the temperature of the fluid.

10. The anemometer of claim 9 wherein the second current is a current pulse.

11. The anemometer of claim 1 wherein the conductor is a filament.

12. A method of measuring a fluid flow, comprising:
 providing a conductor disposed in a flowing fluid, the conductor coupled to a first set of pins and a second set of pins, and the conductor having a portion between the first set of pins wherein the portion includes a resistance related to temperature of the portion;
 providing a current flow through the portion;
 measuring a voltage across the conductor at the second set of pins;
 maintaining a constant resistance of the portion as the fluid flow convects heat away from the portion; and
 calculating the fluid flow based on an amount of energy required to maintain the constant resistance of the portion in the fluid flow.

13. The method of claim 12 and further comprising,
 providing a reference resistance coupled to the current source and in series with the portion;
 measuring a voltage derived from the reference resistance;
 comparing the voltage derived from the reference resistance to the voltage across the conductor at the second set of pins; and
 adjusting the amount of current flow so that the voltages derived from the reference resistor and the conductor are equal.

14. The method of claim 12, and further comprising calibrating the portion at a known temperature including providing a current pulse through the portion and measuring the resistance of the portion while not maintaining a constant resistance of the portion.

15. The method of claim 12 and further comprising,
 providing a second conductor disposed in the flowing fluid, the second conductor coupled to a third set of pins and a fourth set of pins, and the second conductor having a second portion between the third set of pins wherein the second portion includes a resistance related to temperature of the second portion;
 providing a second current flow through the second portion;
 measuring a second voltage across the second portion across the fourth set of pins.

16. The method of claim 15 wherein providing the second current flow includes providing a current pulse having a pulse time selected so as not to substantially heat the second conductor.

17. The method of claim 15 wherein the conductor and the second conductor each include filaments.

* * * * *